No. 610,425. Patented Sept. 6, 1898.
T. B. ABBOTT.
HANDLE FOR KEROSENE TINS OR THE LIKE.
(Application filed May 2, 1898.)
(No Model.)

Witnesses:
Jac. H. P. Richmond
A. L. Donohoe

Inventor:
Thomas B. Abbott
by G. Dittmar
Attorney

UNITED STATES PATENT OFFICE.

THOMAS BEAMONT ABBOTT, OF SALE, VICTORIA.

HANDLE FOR KEROSENE-TINS OR THE LIKE.

SPECIFICATION forming part of Letters Patent No. 610,425, dated September 6, 1898.

Application filed May 2, 1898. Serial No. 679,530. (No model.)

*To all whom it may concern:*

Be it known that I, THOMAS BEAMONT ABBOTT, a subject of the Queen of Great Britain, and a resident of Foster street, Sale, in the Colony of Victoria, Australia, have invented a certain new and useful Handle for Kerosene-Tins or the Like, of which the following is a specification.

The object of this invention is to provide a simple and cheap handle for attachment to empty kerosene-tins and such like receptacles.

The handle is preferably constructed of metal.

In order to make the invention clear, I will refer to the accompanying sheet of drawings, in which—

Figure 1:
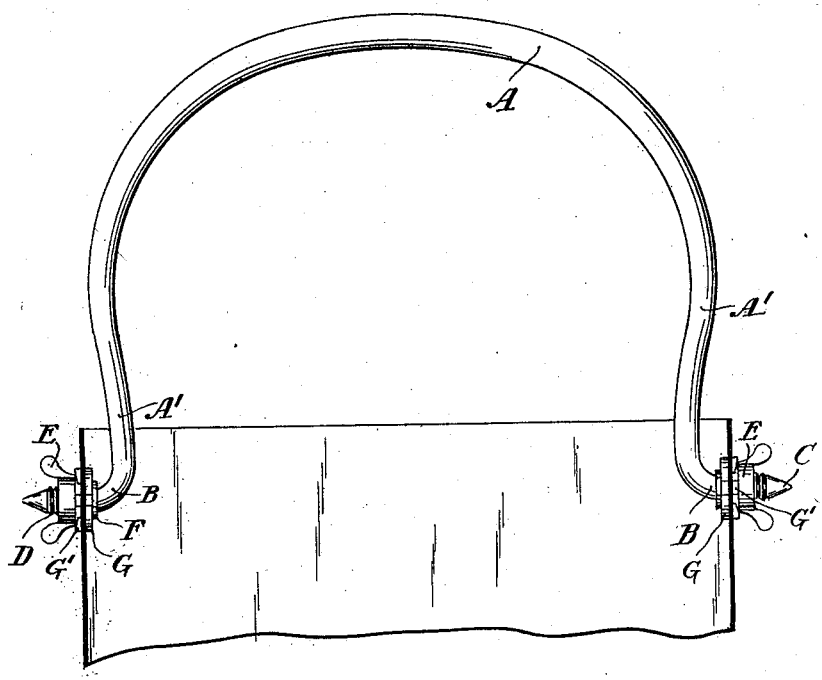
Figure 2:
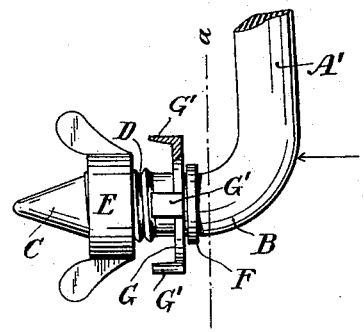
Figure 3:
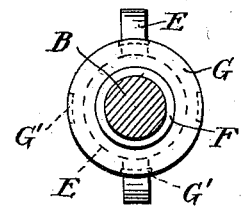

Figure 1 shows the handle attached to a tin. Fig. 2 shows a portion of the handle detached, to an enlarged scale. Fig. 3 shows a sectional view taken on line $a\ a$ of Fig. 2.

The handle has its holding portion A bent to any desired form, such as that shown in Fig. 1, and has its ends B turned outwardly and substantially at right angles to the upright portion A' to rest horizontally when in position. The extremities C are pointed for the purpose of being passed through a tin, and a portion D adjacent to each extremity is threaded to receive a thumb-nut E. A small flange F is set upon each end B, and between the said flange and the thumb-nut E a loose disk or bearing-piece G is mounted, which has pointed projections G' set at right angles to it for the purpose of forming a hold upon the tin. This piece serves to strengthen the bearing for the end B.

In order to secure my handle to a tin, the nuts E are removed, a pointed end is placed against the tin at the desired position, (on its inside,) and a blow given to the handle where indicated by arrow. The end is thus forced through the tin, and similarly the opposite end is driven into position. The projections G' of the disks G are then forced through the tin and the ends of same turned over, Fig. 1. The flanges F will bear against the said disks and the nuts E may be screwed onto the threaded portions, so as to hold the handle in position. The handle will thus be free to turn in its bearings, while the portion G will form a strengthening to the bearing and prevent the tin tearing at the bearing-hole, owing to the force of heavy weights which the tin may carry.

In cases where the tin is sufficiently strong without the pieces G, I may dispense with them, and in such case the flanges F will bear directly against the inside portion of the tin.

Having now particularly described and ascertained the nature of my said invention and in what manner the same is to be performed, I declare that what I claim is—

1. In combination a handle A having its ends turned outwardly at right angles to portion A' such ends carrying fixed flange F and having threaded portion D beyond such flange and pointed extremities C, thumb-nut E substantially as and for the purposes set forth.

2. In combination a handle A, having its ends turned outwardly at right angles to portion A' such ends carrying fixed flange F, loose disk or strengthening-piece G, means for securing same to tin, threaded portion D beyond such disk and pointed extremities C, thumb-nut E substantially as and for the purposes set forth.

Signed at Melbourne, in the Colony of Victoria, Australia, this 16th day of March, 1898.

THOMAS BEAMONT ABBOTT.

Witnesses:
C. W. WADE,
A. HARKER.